US010154622B2

(12) United States Patent
Thompson

(10) Patent No.: US 10,154,622 B2
(45) **Date of Patent: *Dec. 18, 2018**

(54) PORT INTERFACE FOR A PNEUMATIC DISTRIBUTION SYSTEM

(71) Applicant: CNH Industrial Canada, Ltd., Saskatoon (CA)

(72) Inventor: Dennis George Thompson, Saskatoon (CA)

(73) Assignee: CNH Industrial America LLC, New Holland, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/286,980

(22) Filed: Oct. 6, 2016

(65) Prior Publication Data

US 2018/0098487 A1 Apr. 12, 2018

(51) Int. Cl.
*A01C 7/08* (2006.01)

(52) U.S. Cl.
CPC .............. *A01C 7/084* (2013.01); *A01C 7/082* (2013.01); *A01C 7/088* (2013.01)

(58) Field of Classification Search
CPC ........... A01C 7/082; A01C 7/081; A01C 7/08; A01C 7/00; A01C 7/084; A01C 7/088
See application file for complete search history.

(56) References Cited

U.S. PATENT DOCUMENTS

| | | | |
|---|---|---|---|
| 7,555,990 B2 | 7/2009 | Beaujot | |
| 8,635,963 B2 | 1/2014 | Friggstad | |
| 8,690,488 B2 | 4/2014 | Jagow et al. | |
| 2012/0173093 A1* | 7/2012 | Kowalchuk .......... | A01B 79/005 701/50 |

OTHER PUBLICATIONS

U.S. Appl. No. 15/286,938, filed Oct. 6, 2016, Dennis George Thompson.

* cited by examiner

*Primary Examiner* — Christopher J. Novosad
(74) *Attorney, Agent, or Firm* — Rebecca L. Henkel; Rickard K. DeMille

(57) ABSTRACT

A port interface for a pneumatic distribution system includes a first flow passage configured to receive fluidized particulate material from an outlet port of a header and to output the fluidized particulate material to an outlet line. The port interface also includes a second flow passage configured to receive a balancing airflow and to output the balancing airflow to an external environment. In addition, the port interface includes a knife valve having a blade with an opening. The blade is configured to move between a first position in which the opening is substantially aligned with the first flow passage and a solid portion of the blade is substantially aligned with the second flow passage, and a second position in which the opening is substantially aligned with the second flow passage and the solid portion of the blade is substantially aligned with the first flow passage.

20 Claims, 4 Drawing Sheets

PORT INTERFACE FOR A PNEUMATIC DISTRIBUTION SYSTEM

BACKGROUND

The present disclosure relates generally to a port interface for a pneumatic distribution system.

Generally, agricultural seeding implements are towed behind a work vehicle, such as a tractor. These seeding implements typically include multiple row units (e.g., ground engaging opener assemblies) that excavate trenches into soil and deposit particulate material, such as seeds and/or fertilizer, into the trenches. In this manner, rows of the particulate material may be established throughout a field. For example, the particulate material may be stored in a central location, such as in a storage tank of an air cart, and distributed to each of the row units for deposition into the soil. Unfortunately, if a portion of the seeding implement passes over a region of the field that has already received the particulate material, the region may receive more particulate material than desired. As a result, the crop yield within the region may be reduced and/or particulate material may be wasted, thereby reducing the efficiency of the seeding process.

BRIEF DESCRIPTION

In one embodiment, a port interface for a pneumatic distribution system includes a first flow passage configured to receive fluidized particulate material from an outlet port of a header and to output the fluidized particulate material to an outlet line. The port interface also includes a second flow passage configured to receive a balancing airflow and to output the balancing airflow to an external environment. In addition, the port interface includes a knife valve having a blade with an opening. The blade is configured to move between a first position in which the opening is substantially aligned with the first flow passage and a solid portion of the blade is substantially aligned with the second flow passage, and a second position in which the opening is substantially aligned with the second flow passage and the solid portion of the blade is substantially aligned with the first flow passage.

In another embodiment, a port interface for a pneumatic distribution system includes a body and a first flow passage extending through the body. The first flow passage is configured to receive fluidized particulate material from an outlet port of a header and to output the fluidized particulate material to an outlet line. The port interface also includes a second flow passage extending through the body. The second flow passage is configured to receive a balancing airflow and to output the balancing airflow to an external environment. In addition, the port interface includes a valve at least partially disposed within the body. The valve is configured to facilitate flow of the fluidized particulate material through the first flow passage to the outlet line and to substantially block flow of the balancing airflow through the second flow passage to the external environment while the valve is in a first state, and the valve is configured to substantially block flow of the fluidized particulate material through the first flow passage to the outlet line and to facilitate flow of the balancing airflow through the second flow passage to the external environment while the valve is in a second state.

In a further embodiment, a pneumatic distribution system includes a header having an inlet passage and multiple outlet ports. The inlet passage is configured to receive fluidized particulate material, and each outlet port is configured to provide the fluidized particulate material to a respective outlet line. In addition, the pneumatic distribution system includes at least one port interface having a first flow passage with an inlet coupled to a respective outlet port of the header. The first flow passage is configured to receive the fluidized particulate material from the respective outlet port and to output the fluidized particulate material to the respective outlet line. The at least one port interface also includes a second flow passage configured to receive a balancing airflow and to output the balancing airflow to an external environment. In addition, the at least one port interface includes a knife valve having a blade with an opening. The blade is configured to move between a first position in which the opening is substantially aligned with the first flow passage and a solid portion of the blade is substantially aligned with the second flow passage, and a second position in which the opening is substantially aligned with the second flow passage and the solid portion of the blade is substantially aligned with the first flow passage.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
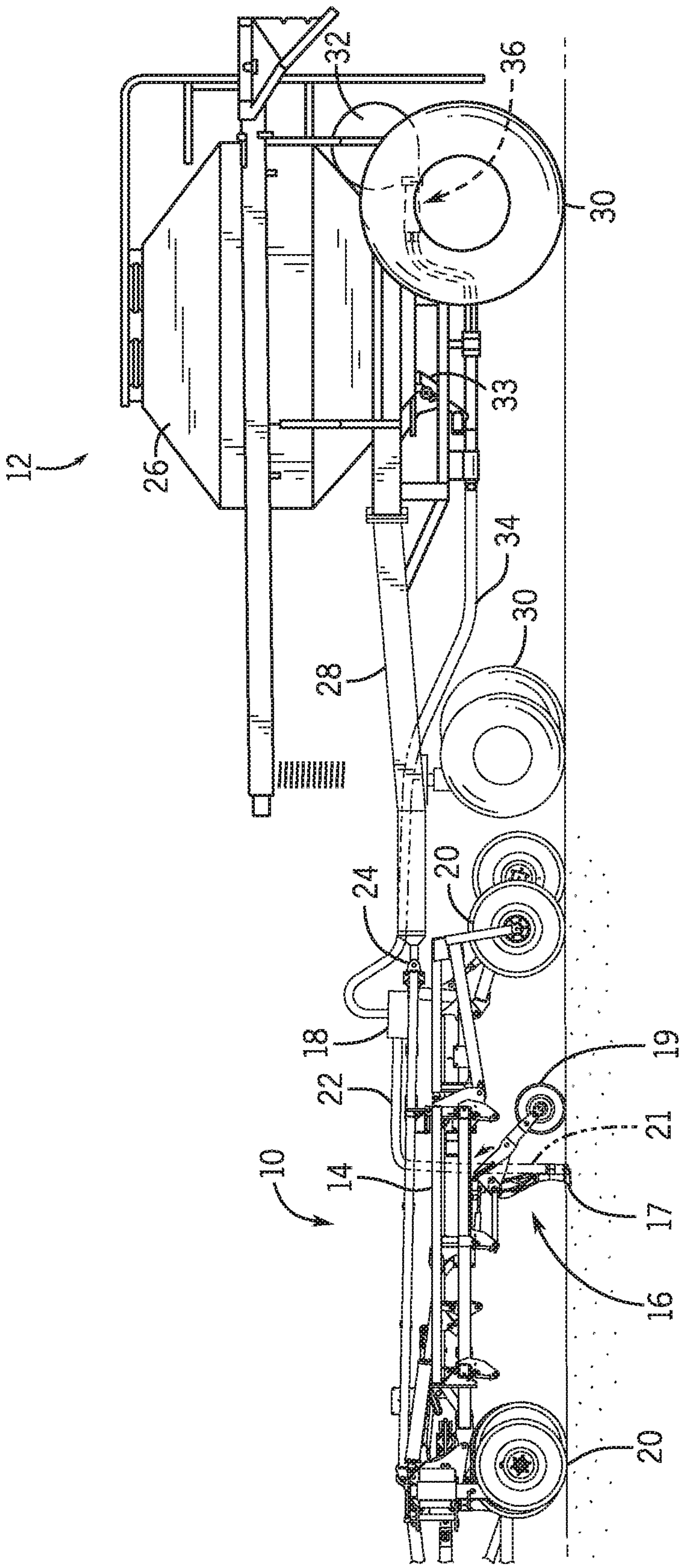
FIG. 1 is a side view of an embodiment of an agricultural implement coupled to an air cart.

Certain agricultural implements (e.g., seeding implements) may distribute a particulate material (e.g., seeds, fertilizer, etc.) to multiple row units (e.g., ground engaging opener assemblies). Additionally, each row unit may engage the ground to excavate a trench into soil, and each row unit may deposit the particulate material into the trench. In this manner, rows of the particulate material may be established throughout a field. The particulate material may include any suitable product/material that is desired to be deposited into the soil, such as various types of seeds and fertilizers.

Generally, each row unit does not provide adjustable control over the deposition of the particulate material. Instead, each row unit may receive fluidized particulate material via a respective pneumatic line. In addition, the row unit may enable received particulate material to drop into the trench via gravity. Accordingly, the rate at which particulate material is deposited into the soil by each row unit may be based on fixed parameters, such as the diameter of the pneumatic line and/or the flow rate of the fluidized particulate material to the row unit, among other factors.

Generally, the particulate material is stored in a centralized location, such as in a storage tank of an air cart, for distribution to each row unit. In certain embodiments, the centralized location is pressurized (e.g., via a pneumatic line). In addition, the particulate material distribution from the centralized location may be controlled (e.g., via meter roller(s), etc.). Furthermore, it may be desirable to deposit the particulate material using only a portion of the row units. For example, a region of the soil under the agricultural implement may have previously received particulate material, or deposition of the particulate material within the region may be undesirable (e.g., the region corresponds to a headland of the field, etc.). In such instances, it may be desirable to control the particulate material flow across the agricultural implement by selectively enabling a portion of the row units to deposit the particulate material while disabling another portion of the row units.

Accordingly, as will be described in more detail below, a pneumatic distribution system may include a header having an inlet passage and multiple outlet ports. The inlet passage is configured to receive fluidized particulate material (e.g., from a storage tank of the air cart, etc.), and each outlet port is configured to provide the fluidized particulate material to a respective secondary line. Each secondary line may be fluidly coupled to a row unit or group of row units (e.g., via a secondary header, tertiary lines, etc.). The pneumatic distribution system may also include at least one port interface having a first flow passage, a second flow passage, and a valve configured to control flow through each passage. The first flow passage is configured to receive the fluidized particulate material from a respective outlet port of the header and to output the fluidized particulate material to a respective secondary line. In addition, the second flow passage is configured to receive a balancing airflow and to output the balancing airflow to an external environment. The valve is configured to facilitate flow of the fluidized particulate material through the first flow passage to the secondary line and to substantially block flow of the balancing airflow through the second flow passage to the external environment while the valve is in a first state, and the valve is configured to substantially block flow of the fluidized particulate material through the first flow passage to the secondary line and to facilitate flow of the balancing airflow through the second flow passage to the external environment while the valve is in a second state. Accordingly, the at least one port interface may control the flow of the particulate material to the row unit or group of row units that receive the particulate material from the respective secondary line. Furthermore, by facilitating flow of the balancing airflow to the external environment while the particulate material flow to the respective secondary line is substantially blocked, the port interface may substantially maintain the total airflow rate through the pneumatic distribution system. As a result, the flow of fluidizing air through the other secondary line(s) may be substantially maintained, thereby substantially maintaining the flow of the particulate material to the row unit(s) that receive the particulate material from the other secondary line(s). In addition, by utilizing multiple port interfaces (e.g., in which an inlet to the first flow passage of each port interface is fluidly coupled to a respective outlet port of the header), control of particulate material flow to certain row units and/or groups of row units that receive the particulate material from secondary lines fluidly coupled to respective port interfaces may be enabled.

FIG. 1 is a side view of an embodiment of an agricultural implement 10 coupled to an air cart 12. As depicted, the agricultural implement 10 includes a tool frame 14 coupled to a row unit 16 (e.g., ground engaging opener assembly), a header 18, and wheel assemblies 20. The agricultural implement may be pulled by a work vehicle (e.g., a tractor) to deposit rows of the particulate material. The wheel assemblies 20 may contact the surface of the soil to enable the agricultural implement 10 to be pulled by the work vehicle. As the agricultural implement 10 is pulled, a row of particulate material may be deposited into the soil by the row unit 16 (e.g., ground engaging opener assembly). Although only one row unit 16 is shown, the agricultural implement 10 may include multiple row units 16 organized in one or more rows across the agricultural implement 10. In some embodiments, the agricultural implement 10 may include one or more rows of 12, 14, 16, 18, 20, or more row units 16, which may each deposit a respective row of particulate material into the soil.

To facilitate depositing the particulate material, each row unit 16 (e.g., ground engaging opener assembly), in the illustrated embodiment, includes an opener 17, a press wheel 19, and a particulate material tube 21. While the opener 17 engages the soil, the opener 17 may exert a force onto the soil that excavates a trench into the soil as the row unit 16 travels through the field. The particulate material may be deposited into the excavated trench via the particulate material tube 21. Then, the press wheel 19 may pack soil onto the deposited particulate material. In certain embodiments, the press wheel of at least one row unit may be omitted. For example, at least one press wheel may be mounted to the frame of the implement behind the at least one row unit. Furthermore, while the illustrated row unit includes a ground engaging opener assembly, it should be appreciated that in alternative embodiments, at least one row unit on the implement may include an applicator assembly configured to deposit particulate material onto the surface of the field, or any other suitable type of material deposition assembly.

The header 18 may provide the particulate material to the row units 16. In some embodiments, the header 18 may pneumatically distribute the particulate material from a primary line to secondary lines. For example, a primary line 34 may direct particulate material from the air cart 12 (e.g., a metering system 33 of the air cart) to the header 18. Additionally, the header 18 may distribute the particulate material to the row units 16 via respective secondary lines 22. In certain embodiments, multiple primary lines 34 may direct particulate material to multiple headers 18. Moreover, multiple secondary lines 22 may extend from each header to respective row units 16. Furthermore, in certain embodiments, at least one secondary line may extend to a secondary header, and multiple tertiary lines may extend from the secondary header to respective row units 16.

In the illustrated embodiment, the air cart 12 is towed behind the agricultural implement 10. For example, the agricultural implement 10 may be coupled to the work vehicle by a first hitch assembly, and the air cart 12 may be coupled to the agricultural implement 10 by a second hitch assembly 24. However, in other embodiments, the agricultural implement may be towed behind the air cart. In further embodiments, the implement and the air cart may be part of a single unit that is towed behind the work vehicle or may be elements of a self-propelled vehicle.

The air cart 12 may centrally store particulate material and distribute the particulate material to the header 18. The air cart 12 includes a storage tank 26, a frame 28, wheels 30, and an air source 32. As illustrated, the towing hitch 24 is coupled between the tool frame 14 and the air cart frame 28, which enables the air cart 12 to be towed with the agricultural implement 10. Additionally, the storage tank 26 is configured to centrally store the particulate material. In some embodiments, the storage tank 26 may include multiple compartments for storing different types of particulate material. For example, a first compartment may store seeds while a second compartment may store a dry fertilizer. In such configurations, the air cart 12 may deliver both seeds and fertilizer to the implement 10 via separate distribution systems, or as a mixture through a single distribution system.

From the storage tank 26, the particulate material may be fed into a pneumatic metering system 33, which meters the particulate material, fluidizes the particulate material via a fluidizing airflow from the air source 32, and distributes the particulate material to the header 18 via the primary line 34. As depicted, the pneumatic metering system 33 is mounted to the bottom of the storage tank 26. To facilitate distributing the particulate material, the fluidizing air generated by the air source 32 is guided though the pneumatic metering system 33 via a plenum 36. In some embodiments, the air source 32 may be one or more pumps and/or blowers powered by electric or hydraulic motor(s), for example.

In certain embodiments (e.g., embodiments in which the air cart is towed behind the implement or embodiments in which the air cart is towed in front of the implement), the air source and/or the plenum may be mounted to a rear portion of the air cart (e.g., relative to a direction of travel). In other embodiments (e.g., embodiments in which the air cart is towed in front of the implement or embodiments in which the air cart is towed behind the implement), the air source and/or the plenum may be mounted to a front portion of the air cart (e.g., relative to the direction of travel). Furthermore, in embodiments in which the air cart includes multiple distribution systems, multiple air sources and/or plenums may be utilized. For example, if the air cart includes two separate distribution systems for separately distributing seeds and fertilizer to the row units, the air cart may include two air sources and two plenums (e.g., one air source and one plenum for each distribution system). In embodiments in which the air cart includes a single distribution system (e.g., in which one or more products are metered from one or more metering systems into pneumatic lines), a single air source and/or a single plenum may be utilized. In certain embodiments, multiple air sources and/or multiple plenums may provide an air flow to multiple groups of lines (e.g., one group of lines coupled to each plenum). In such embodiments, corresponding lines from each group may merge in the metering system, thereby establishing a combined flow to the implement.

In the illustrated embodiment, the primary line 34 is coupled to an inlet passage at a top of the header 18. Accordingly, particulate material flows downwardly through the inlet passage to the outlet ports, which are coupled to the secondary lines 22. However, it should be appreciated that in alternative embodiments, the inlet passage may be positioned at a bottom of the header. Accordingly, particulate material may flow upwardly through the inlet passage to the outlet ports. Furthermore, while the header 18 is coupled to the frame 14 of the implement 10 in the illustrated embodiment, it should be appreciated that in alternative embodiments, the header may be coupled to the frame of the air cart or any other suitable location on the system (e.g., the work vehicle, etc.).

Figure 2:
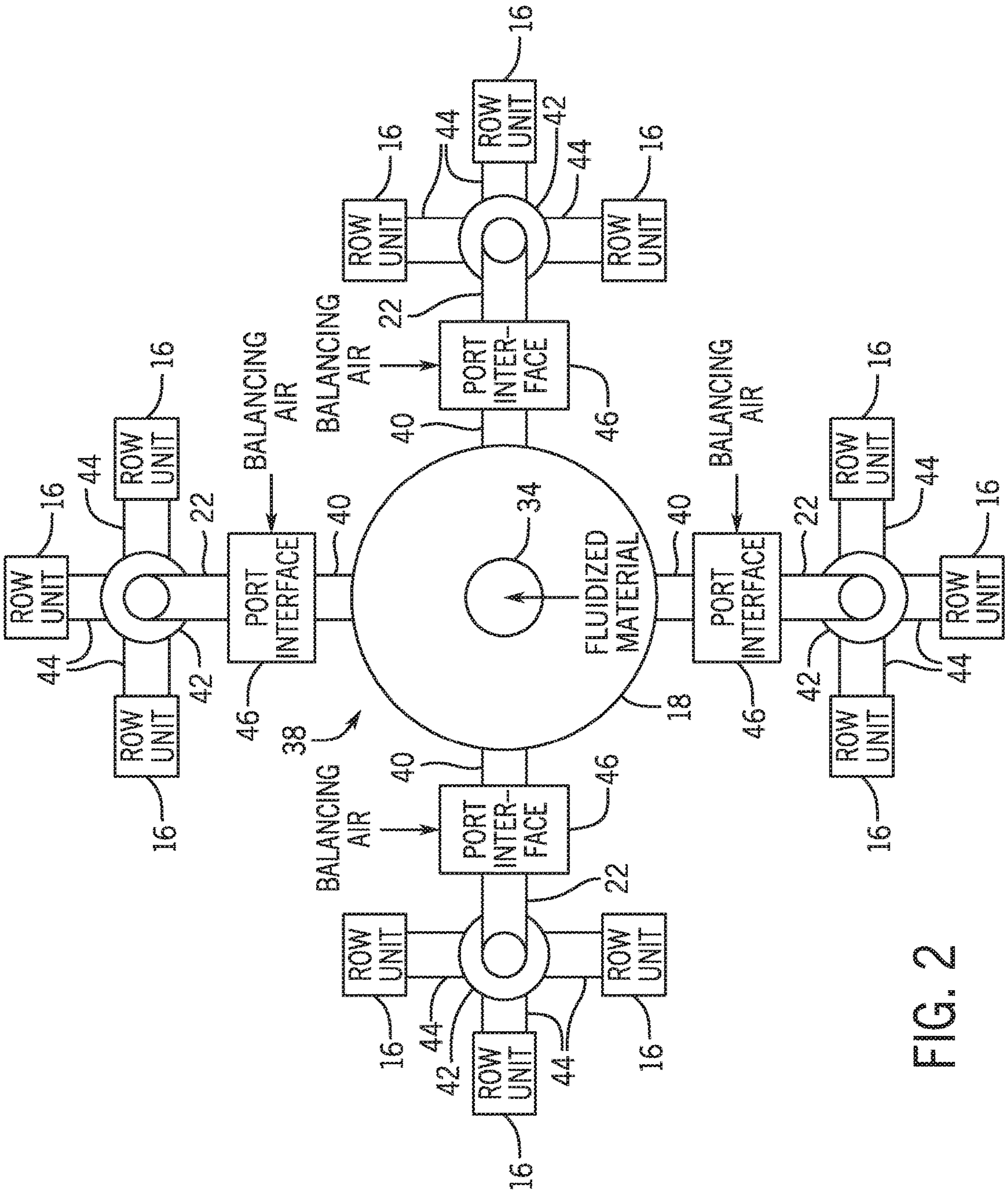
FIG. 2 is a block diagram of an embodiment of a pneumatic distribution system that may be employed within the agricultural implement of FIG. 1.

FIG. 2 is a block diagram of an embodiment of a pneumatic distribution system 38 that may be employed within the agricultural implement of FIG. 1. As illustrated, the pneumatic distribution system 38 includes the primary line 34, the header 18 (e.g., primary header), and the secondary lines 22 (e.g., outlet lines). The primary header 18 is configured to receive fluidized particulate material from the primary line 34 via an inlet passage of the primary header 18. The primary header 18 is configured to distribute the fluidized particulate material to multiple outlet ports 40 of the primary header 18 (e.g., substantially evenly across the outlet ports 40). While the illustrated primary header 18 includes four outlet ports 40, it should be appreciated that in alternative embodiments, the primary header may include more or fewer outlet ports (e.g., 1, 2, 3, 4, 5, 6, 7, 8, 9, 10, or more). Furthermore, in the illustrated embodiment, the outlet ports 40 are distributed about the periphery of the primary header 18. However, it should be appreciated that in alternative embodiments, the outlet ports may be positioned at other portions on the header.

As illustrated, each secondary line 22 is fluidly coupled to a respective outlet port 40. In addition, each secondary line 22 is fluidly coupled to a respective secondary header 42. Each secondary header 42 is configured to distribute the fluidized particulate material from a respective secondary line 22 to multiple row units 16 via respective tertiary lines 44 (e.g., outlet lines). While each secondary header 42 is configured to distribute the fluidized particulate material to three row units 16 in the illustrated embodiment, it should be appreciated that in alternative embodiments, at least one secondary header may be configured to distribute the fluidized particulate material to more or fewer row units (e.g., 1, 2, 3, 4, 5, 6, 7, 8, 9, 10, or more). In addition, in certain embodiments, at least one secondary line may be configured to distribute the fluidized particulate material directly to a respective row unit (e.g., without a secondary header).

In the illustrated embodiment, the pneumatic distribution system 38 includes multiple port interfaces 46. Each port interface 46 is fluidly coupled to a respective outlet port 40 of the primary header 18, and each secondary line 22 is fluidly coupled to a respective port interface 46. Each port interface 46 is configured to control flow of the fluidized particulate material to a respective secondary header 42. For example, in certain embodiments, each port interface 46 may include a body, a first flow passage extending through the body, a second flow passage extending through the body, and a valve at least partially disposed within the body. The first flow passage is configured to receive the fluidized particulate material from the respective output port 40 of the primary header 18 and to output the fluidized particulate material to the respective secondary line 22. Furthermore, the second flow passage is configured to receive balancing airflow and to output the balancing airflow to an external environment. As used herein, "balancing airflow" refers to an airflow that is substantially free from particulate material. For example, the balancing airflow may include less than 20 percent particulate material by volume, less than 10 percent particulate material by volume, less than five percent particulate material by volume, less than three percent particulate material by volume, or less than one percent particulate material by volume. In addition, the purging airflow may include about zero percent particulate material by volume. Furthermore, as used herein, "external environment" refers to an environment external to the pneumatic distribution system, such as the atmosphere and/or another system/device configured to receive an airflow.

The valve is configured to facilitate flow of the fluidized particulate material through the first flow passage to the secondary line and to substantially block flow of the balancing airflow through the second flow passage to the external environment while the valve is in a first state. In addition, the valve is configured to substantially block flow of the fluidized particulate material through the first flow passage to the secondary line and to facilitate flow of the balancing airflow through the second flow passage to the external environment while the valve is in a second state. Accordingly, each port interface controls the flow of the particulate material to the respective secondary header while substantially maintaining the total airflow rate through the pneumatic distribution system.

By way of example, if the row units associated with one secondary header enter a region of the field that has already received the particulate material and/or distribution of the particulate material to the region is not desired (e.g., the region corresponds to a headland of the field, etc.), the valve of the corresponding port interface may be transitioned to the second state, thereby blocking the flow of particulate material. For example, a controller may instruct the valve to transition to the second state as the row units reach the region, such that flow of the particulate material from the row units terminates. Furthermore, with the valve in the second state, the flow of balancing air to the external environment may cause the total airflow rate through the pneumatic distribution system to be substantially maintained. As a result, the flow of fluidizing air to the other secondary line(s) may be substantially maintained, thereby substantially maintaining the flow of particulate material through the other secondary line(s) to the respective row unit(s).

While a port interface is fluidly coupled to each respective outlet port of the primary header in the illustrated embodiment, it should be appreciated that in alternative embodiments, at least one of the port interfaces may be omitted, such that the secondary header is fluidly coupled directly to the outlet port of the primary header by the secondary line. In addition, it should be appreciated that in alternative embodiments, port interface(s) configured to control the flow of the particulate material, while substantially maintaining the total airflow rate through the pneumatic distribution system, may be fluidly coupled to one or more outlet ports of one or more secondary headers. For example, in certain embodiments, port interface(s) may only be fluidly coupled to outlet port(s) of the primary header, port interface (s) may only be fluidly coupled to outlet port(s) of the secondary header(s), or port interfaces may be fluidly coupled to outlet port(s) of the primary header and at least one secondary header.

Figure 3:
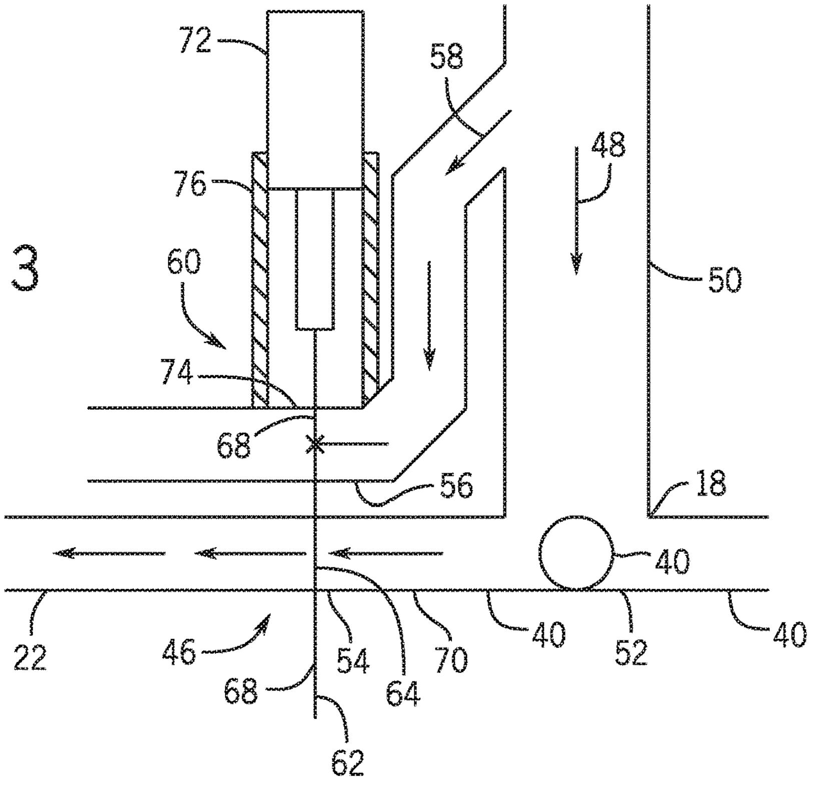
FIG. 3 is a schematic diagram of an embodiment of a port interface that may be employed within the pneumatic distribution system of FIG. 2, in which a valve of the port interface is in a first state.

FIG. 3 is a schematic diagram of an embodiment of a port interface 46 that may be employed within the pneumatic distribution system of FIG. 2, in which a valve of the port interface is in a first state. As previously discussed, the header 18 is configured to receive the fluidized particulate material 48 from the primary line via an inlet passage 50 of the header 18. In the illustrated embodiment, the inlet passage 50 extends downwardly to a body 52 of the header 18, and the outlet ports 40 extend outwardly from/through the body 52. However, it should be appreciated that in alternative embodiments, the inlet passage and/or the outlet ports may be arranged in a different configuration. For example, in certain embodiments, the inlet passage may extend upwardly to the body of the header, and the outlet ports may extend outwardly from/through the body.

In the illustrated embodiment, the port interface 46 includes a first flow passage 54 configured to receive the fluidized particulate material 48 from a respective outlet port 40 of the header 18 and to output the fluidized particulate material to a respective secondary line 22. In addition, the port interface 46 includes a second flow passage 56 configured to receive the balancing airflow 58 and to output the balancing airflow 58 to the external environment. The port interface 46 also includes a knife valve 60 (e.g., knife valve assembly) having a blade 62. The blade 62 includes an opening 64 and a solid portion 68. As illustrated, the blade 62 is in a first position in which the opening 64 is substantially aligned with the first flow passage 54 and the solid portion 68 is substantially aligned with the second flow passage 56, thereby establishing the first state of the knife valve 60. With the knife valve 60 in the first state, the port interface facilitates flow of the particulate material to the secondary line, and the port interface substantially blocks flow of the balancing airflow to the external environment.

As discussed in detail below, the blade 62 is configured to move to a second position in which the opening 64 is substantially aligned with the second flow passage 56 and the solid portion 68 is substantially aligned with the first flow passage 54, thereby establishing the second state of the knife valve 60. With the knife valve 60 in the second state, the port interface substantially blocks flow of the particulate material to the secondary line, and the port interface facilitates flow of the balancing airflow to the external environment. By facilitating flow of the balancing airflow to the external environment while the particulate material flow to the secondary line is substantially blocked, the total airflow rate through the pneumatic distribution system may be substantially maintained. As a result, the flow of fluidizing air through the other secondary line(s) may be substantially maintained, thereby substantially maintaining the flow of the particulate material to the row unit(s) that receive the particulate material from the other secondary line(s).

In the illustrated embodiment, an inlet port 70 of the first flow passage 54 is coupled to the respective outlet port 40 of the primary header 18. However, it should be appreciated that in alternative embodiments, the port interface may be positioned remote from the primary header, and the inlet port of the first flow passage may be fluidly coupled to the outlet port of the header via a pneumatic line, for example. Furthermore, in certain embodiments, the balancing airflow may be provided to the second flow passage by the air source (e.g., blower(s), etc.) that provides the airflow for fluidizing the particulate material. For example, in the illustrated embodiment, the second flow passage 56 is fluidly coupled to the inlet passage 50 of the primary header 18. Accordingly, the second flow passage 56 may receive the balancing airflow 58 from the inlet passage 50. In certain embodiments, a screen may be positioned at an inlet to the second flow passage, thereby substantially blocking the flow of particulate material and facilitating the airflow into the second flow passage. In further embodiments, the inlet to the second flow passage may be fluidly coupled to the inlet passage of the header at a bend (e.g., at an inner radius of the bend), such that a substantial portion of the particulate material bypasses the inlet to the second flow passage, and air flows into the second flow passage.

In the illustrated embodiment, the knife valve 60 (e.g., knife valve assembly) includes an actuator 72 configured to drive the blade 62 between the first and second positions. The actuator 72 is coupled to a body 74 of the port interface 46 by a frame 76. In the illustrated embodiment, the actuator 72 includes a hydraulic cylinder. However, it should be appreciated that in alternative embodiments, the actuator may include a pneumatic cylinder, an electromechanical actuator, or any other suitable type of actuator. While the port interface includes a knife valve in the illustrated embodiment, it should be appreciated that in alternative embodiments, the valve may include any other suitable type of valve configured to control the flow of the particulate material through the first flow passage and the flow of the balancing airflow through the second flow passage. For example, the valve may include a rotary valve at least partially disposed within the body of the port interface, a shutter valve at least partially disposed within the body of the port interface, or any other suitable type of valve.

Figure 4:
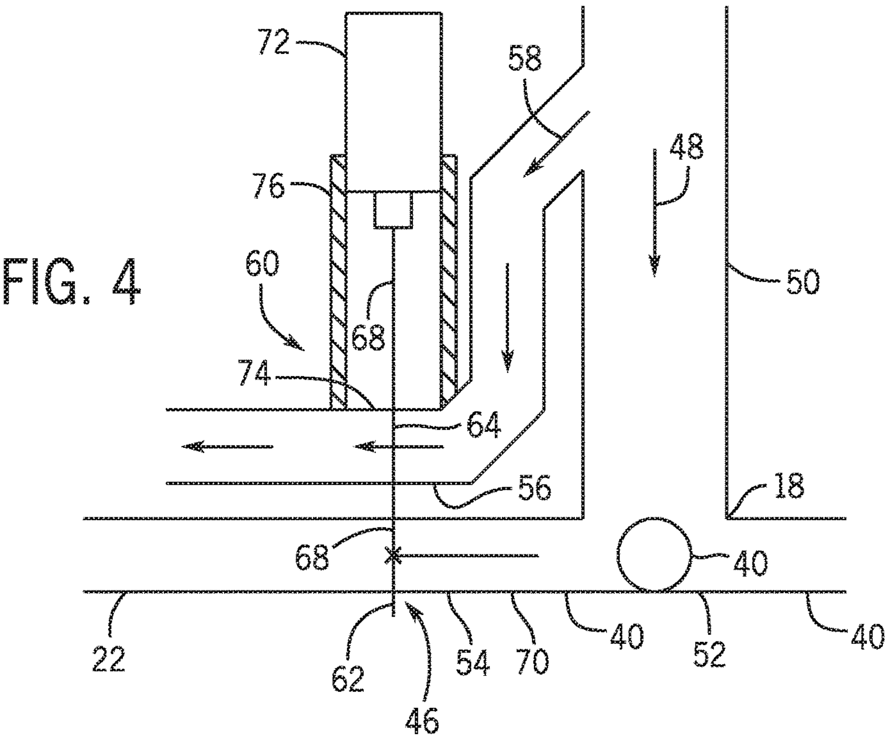
FIG. 4 is a schematic diagram of the port interface of FIG. 3, in which the valve is in a second state.

FIG. 4 is a schematic diagram of the port interface 46 of FIG. 3, in which the valve 60 is in the second state. With the valve 60 in the second state, the blade 62 is in a second position in which the opening 64 is substantially aligned with the second flow passage 56, and the solid portion 68 is substantially aligned with the first flow passage 54. The solid portion 68 of the blade 62 substantially blocks flow of the particulate material 48 to the secondary line 22, and the opening 64 facilitates flow of the balancing airflow 58 to the external environment. By facilitating flow of the balancing airflow to the external environment while the particulate material flow to the secondary line is substantially blocked, the port interface may substantially maintain the total airflow rate through the pneumatic distribution system. For example, in certain embodiments, the second flow passage 56 is configured to enable the balancing air to flow to the external environment (e.g., while the valve is in the second state) at a flow rate that is substantially equal to the flow rate of the fluidizing air through the first flow passage (e.g., while the valve is in the first state). Accordingly, in embodiments in which the balancing air and the fluidizing air are provided by the same air source (e.g., blower, group of blowers, etc.), the total airflow rate through the pneumatic distribution system may be substantially maintained (e.g., while the valve is in the first and second states). As a result, the flow of fluidizing air through the other secondary line(s) may be substantially maintained, thereby substantially maintaining the flow of the particulate material to the row unit(s) that receive the particulate material from the other secondary line(s). In further embodiments, the second flow passage may be configured to enable the balancing air to flow to the external environment (e.g., while the valve is in the second state) at a flow rate that is greater than or less than the flow rate of the fluidizing air through the first flow passage (e.g., while the valve is in the first state), thereby controlling the total airflow rate through the pneumatic distribution system based on the state of the valve. Furthermore, in certain embodiments, the second flow passage may receive the balancing airflow from an air source other than the air source that provides the fluidizing airflow.

Figure 5:
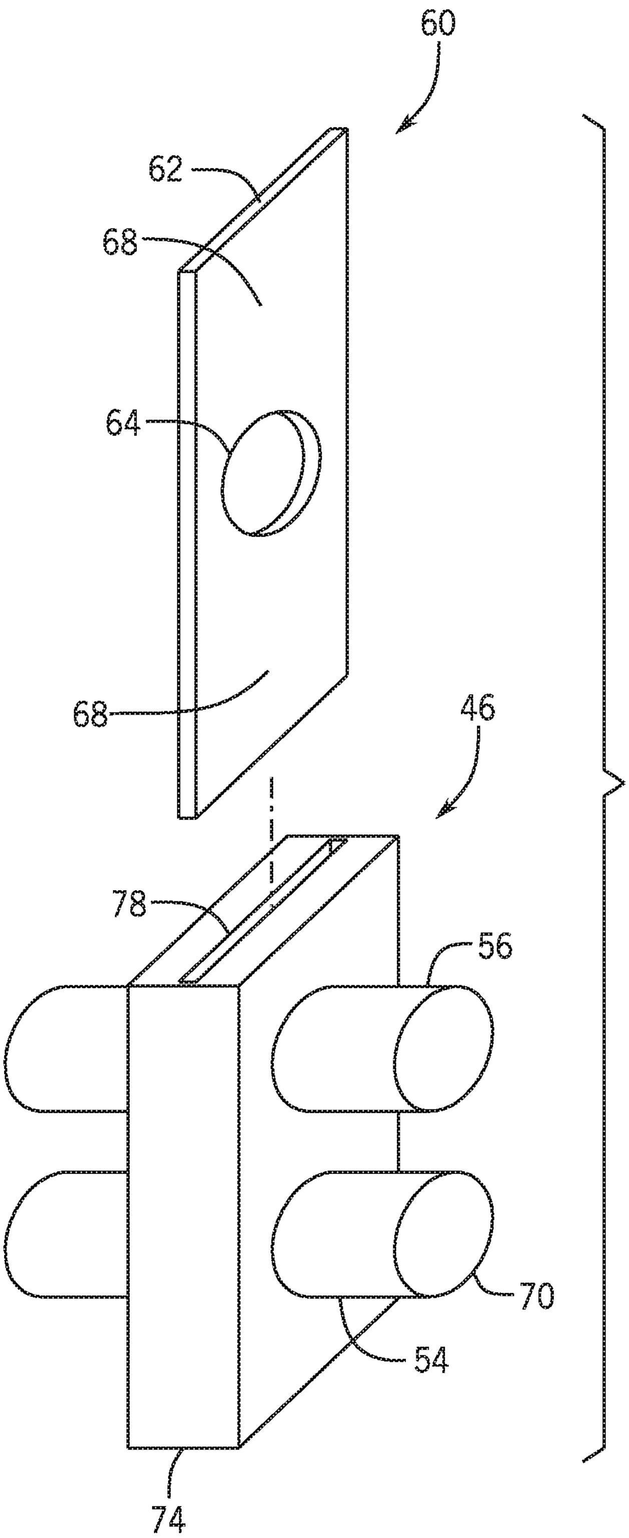
FIG. 5 is an exploded view of an embodiment of a port interface that may be employed within the pneumatic distribution system of FIG. 2.

FIG. 5 is an exploded view of an embodiment of a port interface 46 that may be employed within the pneumatic distribution system of FIG. 2. In the illustrated embodiment, the first flow passage 54 extends through the body 74, and the second flow passage 56 extends through the body 74. Accordingly, both flow passages are at least partially disposed within a common housing (e.g., body), such that both flow passages are proximate to (e.g., not remote from) one another. As previously discussed, the first flow passage 54 is configured to receive the fluidized particulate material from an outlet port of the header (e.g., the primary header) and to output the fluidized particulate material to the secondary line. For example, the inlet port 70 of the first flow passage 54 may be coupled to the outlet port of the header. In addition, the second flow passage 56 is configured to receive the balancing airflow (e.g., from the inlet passage of the header) and to output the balancing airflow to the external environment. For example, the second flow passage 56 may be fluidly coupled to the inlet passage of the header.

In the illustrated embodiment, the valve 60 (e.g., valve assembly) is partially disposed within the body 74. For example, the movable blade 62 of the valve 60 is configured to be disposed within a slot 78 of the body 74. The movable blade 62 includes the opening 64 and the solid portion 68. While the valve 60 is in the first state, the blade 62 is in the first position, such that the opening 64 is substantially aligned with the first flow passage 54, and the solid portion 68 is substantially aligned with the second flow passage 56. Accordingly, with the valve 60 in the first state, the port interface 46 facilitates flow of the fluidized particulate material through the first flow passage 54 to the secondary line and substantially blocks flow of the balancing airflow through the second flow passage 56 to the external environment. In addition, while the valve 60 is in the second state, the blade 62 is in the second position, such that the opening 64 is substantially aligned with the second flow passage 56, and the solid portion 68 of the blade 62 is substantially aligned with the first flow passage 54. Accordingly, with the valve 60 in the second state, the port interface 46 substantially blocks flow of the fluidized particulate material through the first flow passage 54 to the secondary line and facilitates flow of the balancing airflow through the second flow passage 56 to the external environment.

While only certain features have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A port interface for a pneumatic distribution system, comprising:

a first flow passage configured to receive fluidized particulate material from an outlet port of a header and to output the fluidized particulate material to an outlet line;

a second flow passage configured to receive a balancing airflow while the first flow passage is receiving the fluidized particulate material and to output the balancing airflow to an external environment, wherein the balancing airflow is substantially free from the fluidized particulate material; and a knife valve having a blade, wherein the blade has an opening;

wherein the blade is configured to move between a first position in which the opening is substantially aligned with the first flow passage and a solid portion of the blade is substantially aligned with the second flow passage, and a second position in which the opening is substantially aligned with the second flow passage and the solid portion of the blade is substantially aligned with the first flow passage.

2. The port interface of claim 1, wherein an inlet of the first flow passage is coupled to the outlet port of the header.

3. The port interface of claim 1, wherein the knife valve comprises an actuator configured to drive the blade between the first and second positions.

4. The port interface of claim 3, comprising a frame configured to support the actuator on a body of the port interface.

5. The port interface of claim 3, wherein the actuator comprises a hydraulic cylinder.

6. The port interface of claim 1, wherein the second flow passage is fluidly coupled to an air source that is configured to fluidize particulate material to generate the fluidized particulate material.

7. The port interface of claim 6, wherein the second flow passage is fluidly coupled to an inlet passage of the header.

8. A port interface for a pneumatic distribution system, comprising:

a body;

a first flow passage extending through the body, wherein the first flow passage is configured to receive fluidized particulate material from an outlet port of a header and to output the fluidized particulate material to an outlet line;

a second flow passage extending through the body, wherein the second flow passage is configured to receive a balancing airflow while the first flow passage is receiving the fluidized particulate material and to output the balancing airflow to an external environment, and the balancing airflow is substantially free from the fluidized particulate material; and a valve at least partially disposed within the body, wherein the valve is configured to facilitate flow of the fluidized particulate material through the first flow passage to the outlet line and to substantially block flow of the balancing airflow through the second flow passage to the external environment while the valve is in a first state, and the valve is configured to substantially block flow of the fluidized particulate material through the first flow passage to the outlet line and to facilitate flow of the balancing airflow through the second flow passage to the external environment while the valve is in a second state.

9. The port interface of claim 8, wherein the valve comprises a movable blade having an opening, the opening is substantially aligned with the first flow passage and a solid portion of the movable blade is substantially aligned with the second flow passage while the valve is in the first state, and the opening is substantially aligned with the second flow passage and the solid portion of the movable blade is substantially aligned with the first flow passage while the valve is in the second state.

10. The port interface of claim 9, wherein the valve comprises an actuator configured to drive the movable blade.

11. The port interface of claim 10, wherein the actuator comprises a hydraulic cylinder.

12. The port interface of claim 10, comprising a frame configured to support the actuator on the body.

13. The port interface of claim 8, wherein an inlet of the first flow passage is coupled to the outlet port of the header.

14. The port interface of claim 8, wherein the second flow passage is fluidly coupled to an air source that is configured to fluidize particulate material to generate the fluidized particulate material.

15. The port interface of claim 14, wherein the second flow passage is fluidly coupled to an inlet passage of the header.

16. A pneumatic distribution system, comprising:

a header comprising an inlet passage and a plurality of outlet ports, wherein the inlet passage is configured to receive fluidized particulate material, and each outlet port of the plurality of outlet ports is configured to provide the fluidized particulate material to a respective outlet line; and at least one port interface, comprising:

a first flow passage having an inlet coupled to a respective outlet port of the plurality of outlet ports, wherein the first flow passage is configured to receive the fluidized particulate material from the respective outlet port and to output the fluidized particulate material to the respective outlet line;

a second flow passage configured to receive a balancing airflow while the first flow passage is receiving the fluidized particulate material and to output the balancing airflow to an external environment, wherein the balancing airflow is substantially free from the fluidized particulate material; and a knife valve having a blade, wherein the blade has an opening;

wherein the blade is configured to move between a first position in which the opening is substantially aligned with the first flow passage and a solid portion of the blade is substantially aligned with the second flow passage, and a second position in which the opening is substantially aligned with the second flow passage and the solid portion of the blade is substantially aligned with the first flow passage.

17. The pneumatic distribution system of claim 16, wherein the at least one port interface comprises a plurality of port interfaces.

18. The pneumatic distribution system of claim 16, wherein the second flow passage of the at least one port interface is fluidly coupled to the inlet passage of the header.

19. The pneumatic distribution system of claim 16, wherein the second flow passage of the at least one port interface is fluidly coupled to an air source that is configured to fluidize particulate material to generate the fluidized particulate material.

20. The pneumatic distribution system of claim 16, wherein the knife valve of the at least one port interface comprises an actuator configured to drive the blade between the first and second positions.

* * * * *